United States Patent [19]

Fischer

[11] 3,877,924

[45] Apr. 15, 1975

[54] HERBICIDE

[75] Inventor: Adolf Fischer, Mutterstadt, Germany

[73] Assignee: Badische Anilin- & Soda-Fabrik Aktiengesellschaft, Ludwigshafen/Rhein, Germany

[22] Filed: Oct. 5, 1970

[21] Appl. No.: 78,244

[30] Foreign Application Priority Data

Oct. 8, 1969 Germany............................ 1950601

[52] U.S. Cl. ........................ 71/92; 71/103; 71/104; 71/105; 71/111; 71/115; 71/118; 71/121
[51] Int. Cl.............................................. A01n 9/22
[58] Field of Search ........ 71/92, 121, 111, 104, 105

[56] References Cited

UNITED STATES PATENTS

| 3,257,190 | 6/1966 | Soper.................................... 71/105 |
| 3,632,599 | 1/1972 | Zschocke et al....................... 71/92 |

*Primary Examiner*—James O. Thomas, Jr.
*Attorney, Agent, or Firm*—Johnston, Keil, Thompson & Shurtleff

[57] ABSTRACT

A new and valuable mixture of an aniline derivative and an oxadiazolidinedione or an oxadiazinedione or an ester of cyanoacrylic acid or a biscarbamate, which mixture has a good herbicidal action, and a process for controlling the growth of unwanted plants with these compounds.

10 Claims, No Drawings

HERBICIDE

The present invention relates to herbicides, particularly selective herbicides, which are suitable for controlling unwanted plants, especially without damaging crop plants.

It is known to use dinitroaniline derivatives, oxadiazine derivatives, oxadiazolidinedione derivatives, cyanoacrylic acid ethyl ester compounds and diurethane compounds as herbicidal active ingredients; however, their action is not always satisfactory.

I have now found that herbicides containing a mixture of a. a compound having the formula

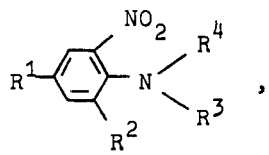

where one of the radicals $R^1$ and $R^2$ denotes nitro and the other of the two radicals denotes methyl, trifluoromethyl or methylsulfonyl, $R^3$ and $R^4$ are identical or different and each denotes alkyl, lower alkyl bearing, preferably in terminal position, one or more halogen, cyano, hydroxy, $N_3$ or alkoxy substituents, each of $R^3$ and $R^4$ also denotes alkenyl or alkynyl; $R^3$ and $R^4$, together with the nitrogen atom whose substituents they are, may form a hexamethylenimine ring, and b. a compound having the formula

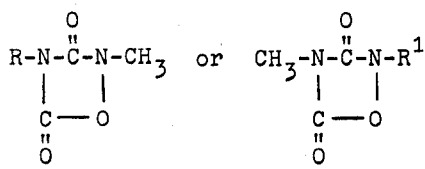

where R denotes m-chlorophenyl, m-trifluoromethylphenyl, 3,4-dichlorophenyl, 3-chloro-4-bromophenyl, methylphenyl or 3-chloro-4-methylphenyl and $R^1$ denotes 3-isopropylcarbamoyloxyphenyl, m-carboxyisopropylphenyl, 3,4-dichlorophenyl, 4-chlorophenyl, phenyl, 3-trifluoromethylphenyl, 3-butylcarbamoyloxyphenyl, cyclohexyl, m-ethylcarbamoyloxyphenyl or m-tert-butylcarbamoyloxyphenyl, or c. a compound having the formula

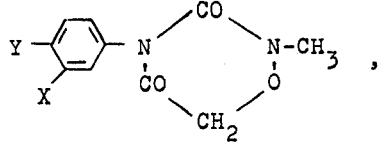

where X and Y are identical or different and each denotes hydrogen, fluoro or trifluoromethyl, or d. a compound having the formula

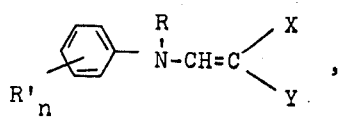

where X and Y denote nitrile, acetyl or —COOR″, R″ denoting a lower aliphatic radical, R denotes hydrogen, a lower aliphatic radical or aralkyl, R' denotes halogen, a lower saturated or unsaturated aliphatic radical, haloalkyl, alkoxy, cyano or thiocyano, non-esterified or esterified carboxyl, nitro, non-N-alkylated or N-alkylated sulfonamide or acylated amino, and n denotes one of the integers 0, 1, 2, 3, 4 and 5, or e. a compound having the formula

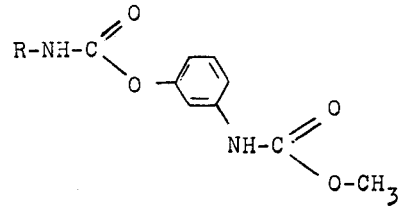

where R denotes haloalkyl, have a good herbicidal action on broadleaved and grassy weeds, including panic grass species.

The individual active ingredients may be mixed in any desired ratio. Mixtures are, however, preferred whose weight ratio of $a$ to $b$ or $c$ or $d$ or $e$ is from 5:1 to 1:3.

The herbicides according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, the solution in water is suitable. However, hydrocarbons, such as tetrahydronaphthalene, and alkylated naphthalenes may also be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents. Concentrates which are suitable for dilution with water may be prepared from active ingredient, emulsifying or dispersing agent and possibly solvent.

Dusts may be prepared by mixing or grinding the active ingredients with a solid carrier.

The action of the mixtures according to the invention is illustrated by the following examples.

EXAMPLE 1

An agricultural plot is sown with seeds of *Gossypium herbaceum, Glycine hispida, Echinochloa crus-galli, Lolium multiflorum, Poa annua, Sinapis arvensis, Matricaria chamomilla* and *Galinsoga parviflora*. The soil prepared in this manner is then treated with the following amounts of the individual active ingredients and mixtures thereof, each amount of each active ingredient and each mixture being dispersed in 500 liters of water per hectare:

I 4-trifluoromethyl-2,6-dinitro-N,N-dipropylaniline, 1.5 and 2 kg per hectare;
II 4-trifluoromethyl-2,6-dinitro-N-β-chloroethyl-N-allylaniline, 2 and 3 kg per hectare;
III N-propyl-N-β-chloroethyl-4-trifluoromethyl-2,6-dinitroaniline, 2 and 3 kg per hectare;
IV N-propyl-N-β-cyanoethyl-4-trifluoromethyl-2,6-dinitroaniline, 1.5 and 2 kg per hectare;
V 2-(m-isopropylcarbamoyloxyphenyl)-4-methyl-1,2,4-oxadiazolidine-3,5-dione, 0.5 and 2 kg per hectare;

-Continued

VI 2-(3,4-dichlorophenyl)-4-methyl-1,2,4-oxadiazolidine-3,5-dione, 1 and 3 kg per hectare;
VII 4-(3,4-dichlorophenyl)-2-methyl-1,2,4-oxadiazolidine-3,5-dione, 1 and 3 kg per hectare;
VIII 2-(m-tert-butylcarbamoyloxyphenyl)-4-methyl-1,2,4-oxadiazolidine-3,5-dione, 0.5 and 2 kg per hectare;

I + V    : 1.5 + 0.5 kg per hectare;
II + VI  : 2 + 1 kg per hectare;
III + VII : 2 + 1 kg per hectare;
IV + VIII : 1.5 + 0.5 kg per hectare.

After 4 weeks it is ascertained that the mixtures, compared with the individual active ingredients, have an excellent herbicidal action combined with very good crop plant compatibility.

The results of the experiment are given in the following table:

I 4-trifluoromethyl-2,6-dinitro-N,N-dipropylaniline, 1.5 and 3 kg per hectare;
II 4-trifluoromethyl-2,6-dinitro-N-β-chloroethyl-N-allylaniline, 1.5 and 3 kg per hectare;
III N-propyl-N-β-chloroethyl-4-trifluoromethyl-2,6-dinitroaniline, 1.5 and 3 kg per hectare;
IV 2-methyl-4-(p-fluorophenyl)-tetrahydro-1,2,4-oxadiazine-3,5-dione, 1.5 and 3 kg per hectare;
V 2-methyl-4-(3-trifluoromethylphenyl)-tetrahydro-1,2,4-oxadiazine-3,5-dione, 1.5 and 3 kg per hectare;
VI ethyl-β-(N-phenyl-N-methyl)-amino-α-cyanoacrylate, 1.5 and 3 kg per hectare;

I + IV   : 1.5 + 1.5 kg per hectare;
II + V   : 1.5 + 1.5 kg per hectare;
III + VI : 1.5 + 1.5 kg per hectare;

After 3 to 4 weeks it is ascertained that the mixtures, compared with the individual active ingredients, have

| kg/ha | I | | II | | III | | IV | | V | | VI | | VII | | VIII | |
|---|---|---|---|---|---|---|---|---|---|---|---|---|---|---|---|---|
| | 1.5 | 2 | 2 | 3 | 2 | 3 | 1.5 | 2 | 0.5 | 2 | 1 | 3 | 1 | 3 | 0.5 | 2 |
| Gossypium herbaceum | 0 | 5 | 0 | 0 | 0 | 0 | 0 | 0 | 0 | 30 | 0 | 0 | 0 | 10 | 10 | 50 |
| Glycine hispida | 0 | 5 | 0 | 0 | 0 | 0 | 0 | 0 | 0 | 30 | 0 | 0 | 0 | 15 | 0 | 50 |
| Echinochloa crus-galli | 80 | 90 | 85 | 95 | 90 | 100 | 80 | 80 | 30 | 60 | 0 | 40 | 0 | 10 | 55 | 90 |
| Lolium multiflorum | 80 | 90 | 85 | 95 | 90 | 100 | 80 | 85 | 50 | 70 | 40 | 50 | 40 | 60 | 60 | 90 |
| Poa annua | 90 | 95 | 90 | 100 | 95 | 100 | 85 | 90 | 60 | 80 | 50 | 70 | 45 | 55 | 65 | 90 |
| Sinapis arvensis | 0 | 0 | 15 | 30 | 20 | 30 | 0 | 0 | 80 | 95 | 90 | 100 | 80 | 90 | 100 | 100 |
| Matricaria chamomilla | 0 | 0 | 0 | 10 | 0 | 0 | 0 | 0 | 80 | 90 | 90 | 90 | 80 | 90 | 100 | 100 |
| Galinsoga parviflora | 20 | 30 | 35 | 55 | 20 | 35 | 0 | 0 | 85 | 100 | 90 | 100 | 80 | 95 | 100 | 100 |

| | I+V | II+VI | III+VII | IV+VIII |
|---|---|---|---|---|
| | 1.5+0.5 | 2+1 | 2+1 | 1.5+0.5 |
| Gossypium herbaceum | 0 | 0 | 0 | 10 |
| Glycine hispida | 0 | 0 | 0 | 0 |
| Echinochloa crus-galli | 100 | 85 | 90 | 100 |
| Lolium multiflorum | 100 | 100 | 100 | 100 |
| Poa annua | 100 | 100 | 100 | 100 |
| Sinapis arvensis | 80 | 100 | 100 | 100 |
| Matricaria chamomilla | 80 | 100 | 80 | 100 |
| Galinsoga parviflora | 100 | 100 | 100 | 100 |

0 = no damage
100 = complete destruction

EXAMPLE 2

An agricultural plot is sown with seeds of *Gossypium herbaceum*, *Glycine hispida*, *Echinochloa crus-galli*, *Lolium multiflorum*, *Poa annua*, *Amaranthus retroflexus*, *Galinsoga parviflora* and *Sinapis arvensis*. The soil prepared in this manner is then treated with the following amounts of the individual active ingredients and mixture thereof, each amount of each active ingredient and each mixture being dispersed in 500 liters of water per hectare:

a stronger herbicidal action combined with more favorable crop plant compatibility.

The results of the experiment are given in the following table:

| kg/ha | I | | II | | III | | IV | | V | | VI | |
|---|---|---|---|---|---|---|---|---|---|---|---|---|
| | 1.5 | 3 | 1.5 | 3 | 1.5 | 3 | 1.5 | 3 | 1.5 | 3 | 1.5 | 3 |
| Gossypium herbaceum | 0 | 0 | 0 | 0 | 0 | 0 | 0 | 0 | 0 | 0 | 0 | 0 |
| Glycine hispida | 0 | 10 | 0 | 0 | 0 | 0 | 0 | 10 | 0 | 10 | 5 | 20 |
| Echinochloa crus-galli | 80 | 90 | 80 | 95 | 80 | 100 | 40 | 60 | 40 | 65 | 40 | 80 |
| Lolium multiflorum | 80 | 95 | 80 | 95 | 80 | 100 | 60 | 80 | 60 | 80 | 65 | 85 |
| Poa annua | 90 | 100 | 85 | 100 | 80 | 100 | 70 | 85 | 70 | 85 | 70 | 90 |
| Amaranthus retroflexus | 0 | 5 | 0 | 10 | 0 | 30 | 80 | 95 | 85 | 90 | 80 | 80 |
| Galinsoga parviflora | 20 | 30 | 20 | 55 | 5 | 35 | 85 | 95 | 80 | 90 | 90 | 100 |
| Sinapis arvensis | 0 | 10 | 10 | 40 | 5 | 30 | 80 | 90 | 80 | 90 | 80 | 80 |

| kg/ha | I + IV | II + V | III + VI |
|---|---|---|---|
| | 1.5 + 1.5 | 1.5 + 1.5 | 1.5 + 1.5 |
| Gossypium herbaceum | 0 | 0 | 0 |
| Glycine hispida | 0 | 0 | 5 |
| Echinochloa crus-galli | 100 | 100 | 100 |
| Lolium multiflorum | 100 | 100 | 100 |
| Poa annua | 100 | 100 | 100 |
| Amaranthus retroflexus | 80 | 90 | 80 |
| Galinsoga parviflora | 100 | 100 | 95 |
| Sinapis arvensis | 80 | 90 | 85 |

0 = no damage
100 = complete destruction

EXAMPLE 3

An agricultural plot is sown with seeds of *Gossypium herbaceum*, *Glycine hispida*, *Echinochloa crus-galli*, *Lolium multiflorum*, *Poa annua*, *Matricaria chamomilla*, *Galinsoga parviflora* and *Amaranthus retroflexus*.

The soil prepared in this manner is then treated with the following amounts of the individual active ingredients and mixture of them, each amount of each active ingredient and the mixture being dispersed in 500 liters of water per hectare:

I  4-trifluoromethyl-2,6-dinitro-N-β-chloroethyl-N-allylaniline, 1.5 and 3 kg per hectare;

II  N-(1-chloromethylpropyl)-carbamic acid-(m-carbomethoxyaminophenyl)-ester, 1.5 and 3 kg per hectare;

I + II : 1.5 = 1.5 kg per hectare.

After 4 weeks the mixture, compared with the individual active ingredients, has an excellent herbicidal action combined with very good crop plant compatibility.

The results of the experiment are given in the following table:

| kg/ha | I 1.5 | 3 | II 1.5 | 3 | I + II 1.5 + 1.5 |
|---|---|---|---|---|---|
| Gossypium herbaceum | 0 | 0 | 0 | 0 | 0 |
| Glycine hispida | 0 | 0 | 5 | 25 | 0 |
| Echinochloa crus-galli | 80 | 100 | 70 | 90 | 100 |
| Lolium multiflorum | 80 | 100 | 75 | 95 | 100 |
| Poa annua | 80 | 100 | 80 | 100 | 100 |
| Matricaria chamomilla | 0 | 10 | 100 | 100 | 100 |
| Galinsoga parviflora | 20 | 55 | 100 | 100 | 100 |
| Amaranthus retroflexus | 0 | 10 | 80 | 95 | 80 |

0 = no damage
100 = complete destruction

The action of the following mixtures corresponds to that of those in Examples 1 to 3:

N-allyl-N-(2'-chloroethyl)-2,6-dinitro-4-trifluoromethylaniline;
N-propyl-N-β-chloroethyl-2,6-dinitro-4-trifluoromethylaniline;
N-isobutyl-N-β-cyanoethyl-2,6-dinitro-4-trifluoromethylaniline;
N-ethyl-N-butyl-2,6-dinitro-4-trifluoromethylaniline;
N-ethyl-N-β-cyanoethyl-2,6-dinitro-4-trifluoromethylaniline;
N-(β-methylcarbamoyloxo)-ethyl-2,6-dinitro-4-trifluoromethylaniline;
N-(β-chloroacetyloxo)-ethyl-2,6-dinitro-4-trifluoromethylaniline;
N-propyl-N-(2'-cyanoethyl)-2,6-dinitro-4-trifluoromethylaniline;
N,N-bis-β-(chloroethyl)-2,6-dinitro-4-trifluoromethylaniline;
N-propyl-N-β-(chloroacetyloxo)-ethyl-2,6-dinitro-4-trifluoromethylaniline;
N-propyl-N-β-azidoethyl-2,6-dinitro-4-trifluoromethylaniline;
N-methyl-N-β-cyanoethyl-2,6-dinitro-4-trifluoromethylaniline;
N-propyl-N-β-chloropropyl-2,6-dinitro-4-trifluoromethylaniline;
N-propyl-N-β-bromoethyl-2,6-dinitro-4-trifluoromethylaniline;
N-β-methoxyethyl-N-β-cyanoethyl-2,6-dinitro-4-trifluoromethylaniline;
N-butyl-N-β-cyanoethyl-2,6-dinitro-4-trifluoromethylaniline;
N,N-bis-(β-chloroacetyloxo)-ethyl-2,6-dinitro-4-trifluoromethylaniline;
N-ethyl-N-β-chloroethyl-2,6-dinitro-4-trifluoromethylaniline;
N-butyl-N-β-chloropropyl-2,6-dinitro-4-trifluoromethylaniline;
N-ethyl-N-β-azidoethyl-2,6-dinitro-4-trifluoromethylaniline;
N-methyl-N-β-cyanoethyl-2,6-dinitro-4-trifluoromethylaniline;
N,N-bis-β-(chloroethyl)-2,6-dinitro-4-trifluoromethylaniline;
N-propyl-N-allyl-4,6-dinitro-2-trifluoromethylaniline;
N-β-methoxyethyl-N-β-azidoethyl-2,6-dinitro-4-trifluoromethylaniline;
N,N-bis-β-(chloroethyl)-2,6-dinitro-4-methylaniline; and
N'N-dipropyl-2,6-dinitrotrifluoromethylaniline with 2-(3'-tert-butylcarbamoyloxyphenyl)-4-methyltetrahydro-1,2,4-oxadiazole-3,5-dione;
2-(3'-isopropylcarbamoyloxyphenyl)-4-methyltetrahydro-1,2,4-oxadiazole-3,5-dione;
2-(m-butylcarbamoylphenyl)-4-methyl-1,2,4-oxadiazolidine-3,5-dione;
4-methyl-2-(3',4'-dichlorophenyl)-tetrahydro-1,2,4-oxadiazole-3,5-dione;
2-(4-chlorophenyl)-4-methyl-1,2,4-oxadiazolidine-3,5-dione;
4-methyl-2-(3'-trifluoromethylphenyl)-tetrahydro-1,2,4-oxadiazole-3,5-dione;
4-methyl-2-(3,4-dibromophenyl)-tetrahydro-1,2,4-oxadiazole-3,5-dione;
2-methyl-4-(3',4'-dichlorophenyl)-tetrahydro-1,2,4-oxadiazole-3,5-dione;
4-(3'-tert-butylcarbamoyloxyphenyl)-2-methyl-1,2,4-oxadiazolidine-3,5-dione;
2-methyl-4-(3-chloropheyl)-tetrahydro-1,2,4-oxadiazole-3,5-dione;
2-methyl-4-(4-fluorophenyl)-tetrahydro-1,2,4-oxadiazole-3,5-dione;
2-methyl-4-(3-trifluoromethylphenyl)-tetrahydro-1,2,4-oxadiazole-3,5-dione;
2-methyl-4-(3-chloro-4-bromophenyl)-tetrahydro-1,2,4-oxadiazole-3,5-dione;

or 2-methyl-4-(4'-fluorophenyl)-tetrahydro-1,2,4-oxadiazine-3,5-dione;

or

β-(N-phenyl-N-methyl)-amino-α-cyanoacrylic acid ethyl ester;

or

N-(1-chloromethylpropyl)-carbamic acid-(m-carbomethoxyaminophenyl)-ester;
N-(1-γ-chloropropyl)-carbamic acid-(m-carbomethoxyaminophenyl)-ester;
N-(β-chloropropyl)-carbamic acid-(m-carbomethoxyaminophenyl)-ester;

N-(1,1-dimethyl-2-chloroethyl)-carbamic acid-(m-carbomethoxyaminophenyl)-ester;

N-(2,2-dimethyl-2-chloroethyl)-carbamic acid-(m-carbomethoxyaminophenyl)-ester;

or

[tris-(chloromethyl)-methyl]-carbamic acid-(m-carbomethoxyaminophenyl)-ester.

I claim:

1. A herbicide composition containing a herbicidally effective amount of a mixture of a. a compound having the formula

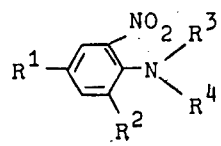

wherein $R^1$ is trifluoromethyl and $R^2$ is nitro, $R^3$ is propyl or β-chloroethyl and $R^4$ is propyl or allyl, and b. a compound selected from the group consisting of 2-(m-isopropylcarbamoyloxyphenyl)-4-methyl-1,2,4-oxadiazolidine-3,5-dione and 2-(3,4-dichlorophenyl)-4-methyl-1,2,4-oxadiazolidine-3,5-dione in a weight ratio of a:b in the range of 5:1 to 1:3.

2. A herbicide composition as claimed in claim 1 wherein compound a is a member selected from the group consisting of 4-trifluoromethyl-2,6-dinitro-N,N-dipropylaniline, 4-trifluoromethyl-2,6-dinitro-N-β-chloroethyl-N-allylaniline, and N-propyl-N-β-chloroethyl-4-trifluoromethyl-2,6-dinitroaniline.

3. A herbicide composition containing a herbicidally effective amount of a mixture of the compounds a. 4-trifluoromethyl-2,6-dinitro-N,N-dipropylaniline or N-propyl-N-β-chloroethyl-4-trifluoromethyl-2,6-dinitroaniline, and b. 2-(3,4-dichlorophenyl)-4-methyl-1,2,4-oxadiazolidine-3,5-dione in a weight ratio of a:b in the range of 5:1 to 1:3.

4. A herbicide composition as claimed in claim 3 wherein compound (a) is N-propyl-N-β-chloroethyl-4-trifluoromethyl-2,6-dinitroaniline.

5. A herbicide composition as claimed in claim 3 wherein compound (a) is 4-trifluoromethyl-2,6-dinitro-N,N-dipropylaniline.

6. A process for controlling the growth of unwanted plants among crop plants wherein the soil in which the growth of unwanted plants among crop plants is to be prevented is treated with a herbicidally effective amount of a mixture of a. a compound having the formula

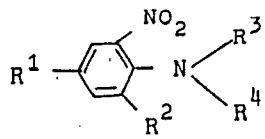

wherein $R^1$ is trifluoromethyl and $R^2$ is nitro, $R^3$ is propyl or β-chloroethyl and $R^4$ is propyl or allyl, and b. a compound selected from the group consisting of 2-(m-isopropylcarbamoyloxyphenyl)-4-methyl-1,2,4-oxadiazolidine-3,5-dione and 2-(3,4-dichlorophenyl)-4-methyl-1,2,4-oxadiazolidine-3,5-dione in a weight ratio of a:b in the range of 5:1 to 1:3.

7. A process as claimed in claim 6 wherein compound a is a member selected from the group consisting of 4-trifluoromethyl-2,6-dinitro-N,N-dipropylaniline, 4-trifluoromethyl-2,6-dinitro-N-β-chloroethyl-N-allylaniline and N-propyl-N-β-chloroethyl-4-trifluoromethyl-2,6-dinitroaniline.

8. A process for controlling the growth of unwanted plants among crop plants wherein the soil in which the growth of unwanted plants among crop plants is to be prevented is treated with a herbicidally effective amount of a mixture of the compounds a. 4-trifluoromethyl-2,6-dinitro-N,N-dipropylaniline or N-propyl-N-β-chloroethyl-4-trifluoromethyl-2,6-dinitroaniline and b. 2-(3,4-dichlorophenyl)-4-methyl-1,2,4-oxadiazolidine-3,5-dione in a weight ratio of a:b in the range of 5:1 to 1:3.

9. A process as claimed in claim 8 wherein compound (a) is N-propyl-N-β-chloroethyl-4-trifluoromethyl-2,6-dinitroaniline.

10. A process as claimed in claim 8 wherein compound (a) is 4-trifluoromethyl-2,6-dinitro-N,N-dipropylaniline.

* * * * *